United States Patent
Hirayama et al.

(10) Patent No.: US 7,751,970 B2
(45) Date of Patent: Jul. 6, 2010

(54) INFORMATION PROVIDING APPARATUS, INFORMATION PROVIDING METHOD, AND COMPUTER PRODUCT

(75) Inventors: Naofumi Hirayama, Tokyo (JP); Takeshi Igarashi, Tokyo (JP); Mineki Miyasaka, Tokyo (JP); Yohei Nakajima, Tokyo (JP)

(73) Assignee: Pioneer Corporation, Tokyo (JP)

( * ) Notice: Subject to any disclaimer, the term of this patent is extended or adjusted under 35 U.S.C. 154(b) by 264 days.

(21) Appl. No.: 11/782,327

(22) Filed: Jul. 24, 2007

(65) Prior Publication Data

US 2008/0033638 A1 Feb. 7, 2008

(30) Foreign Application Priority Data

Aug. 7, 2006 (JP) ............................. 2006-214552

(51) Int. Cl.
*G01C 21/00* (2006.01)

(52) U.S. Cl. .................................................... 701/202

(58) Field of Classification Search ......... 701/200–202, 701/206–209, 211, 213; 340/988, 990–993, 340/995.1, 995.14, 995.17, 995.19, 995.2, 340/995.21–995.27
See application file for complete search history.

(56) References Cited

U.S. PATENT DOCUMENTS

2006/0195241 A1* 8/2006 Nakagoshi ................... 701/45
2008/0195315 A1* 8/2008 Hu et al. ..................... 701/212

FOREIGN PATENT DOCUMENTS

| JP | 2002-277258 A | 9/2002 |
| JP | 2003-329463 A | 11/2003 |
| JP | 2005-251111 A | 9/2005 |
| JP | 2006-48171 A | 2/2006 |
| JP | 2006-90790 A | 4/2006 |
| WO | WO/2006/035755 | * 6/2006 |

* cited by examiner

*Primary Examiner*—Kim T Nguyen
(74) *Attorney, Agent, or Firm*—Foley & Lardner LLP

(57) ABSTRACT

To safely and easily provide information that an operator needs, when a mobile body has started to move, a first acquiring unit and a second acquiring unit respectively acquire corresponding image information. Using the acquired image information and map information, an extracting unit extracts map information identical to the image information of the scenery around the mobile body. A selecting unit selects, from the extracted map information, an object that coincides with the position of the point viewed by the operator in the image information of the scenery around the mobile body. An output unit outputs information concerning the selected object.

15 Claims, 7 Drawing Sheets

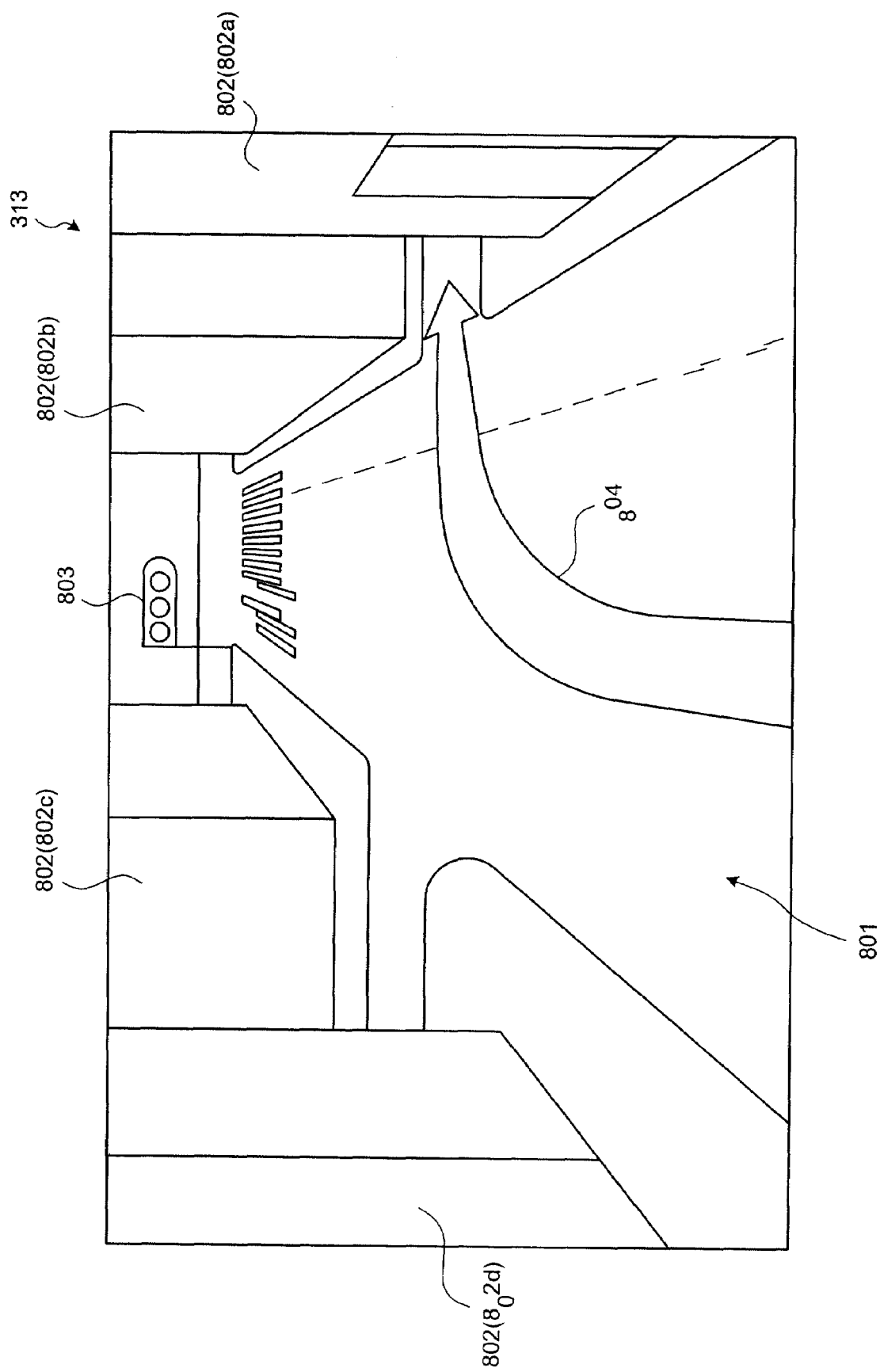

INFORMATION PROVIDING APPARATUS, INFORMATION PROVIDING METHOD, AND COMPUTER PRODUCT

BACKGROUND OF THE INVENTION

1. Field of the Invention

The present invention relates to route guidance and an apparatus, method, and computer product thereof.

2. Description of the Related Art

Conventionally, an apparatus that guides a user to a destination such as, for example, a navigation apparatus loaded on a vehicle is known. Such an apparatus can guide the user to the destination using, for example, map information and information on the current location of the vehicle and the destination and by outputting sound and images that indicate a direction for the user to proceed at a traffic intersection (such as turning to the right or left, going straight).

Conventionally, for example, a technique has been known that executes an object monitoring process by obtaining information on the direction of the line of sight of a user identified by a line-of-sight identifying apparatus and an image shot by an object monitoring camera; determining the position of the point viewed by the user in the image; marking the position of the determined vantage point; determining (detecting) a shot object in the marked position as a subject to be monitored; and following and monitoring the subject while moving the marker in correspondence with the movement of the image, which follows the movement of the vehicle (see, for example, Japanese Patent Application Laid-Open Publication No. 2005-251111).

Another known conventional technique, for example, is an apparatus that is loaded on a vehicle and displays various types of information. The apparatus includes a basic display screen that displays various types of information about the vehicle and a unit that displays an image of the environs the vehicle, and enables the driver to recognize the image of the environs of the vehicle when the driver is looking at the main display image (see, for example, Japanese Patent Application Laid-Open Publication No. 2002-277258).

Conventionally, for example, a technique is known that recognizes an object attentively observed by a driver based on an image of the environs of the vehicle and the direction of the line of sight of the driver, estimates a situation of the driver using line of sight distributions that are calculated corresponding to an observation time of the recognized object and a linear identifying function, and presents information to the driver corresponding to the estimated situation of the driver (see, for example, Japanese Patent Application Laid-Open Publication No. 2006-048171).

Conventionally, a variation of the above apparatus is known in which the apparatus outputs, for example, sound and images that provide guidance using detailed information of an arbitrary location on a map. Such an apparatus outputs sound and images that provide guidance by detailed information of a designated location when an operative input manipulation is performed to cause the apparatus to report the detailed information in a state where an arbitrary location on the map is designated.

Conventionally, for example, a technique is known that, when a question by a vehicle operator about an object outside a vehicle is detected, checks the direction of the line of sight of the vehicle operator and an image of the environs the vehicle at a predetermined time period before the time at which the question had been detected, identifies the object, outside the vehicle, that had been in the line of sight of the vehicle operator before the predetermined time period, and obtains and provides information on the identified object (see, for example, Japanese Patent Application Laid-Open Publication No. 2006-090790).

However, with the conventional apparatuses problems have arisen. For example, if the road along which the vehicle is traveling immediately forks after the driver makes a right or left turn in compliance with the sound and image output by the apparatus, the driver may not be able to discern which road to take and may take the wrong road.

As a countermeasure, the frequency of sound and image guidance may be increased, or more detailed guide information may be output, when the vehicle passes through a location where a driver generally tends to take the wrong road. However, an example of a problem that may arise with the countermeasure is that the driver may find the sound and the images output to be too much and bothersome.

The first three conventional techniques described above are techniques to avoid collisions that may occur as a result of the line of sight of the driver being detracted from the road, and are not techniques to indicate whether the route the driver is about to take is correct.

Conventional apparatuses can provide guidance via detailed information of an arbitrary location on a map by executing predetermined operative input commands. However, an example of a problem that may arise is when the driver executes the operative input manipulation while operating the vehicle, which requires the line of sight of the driver to be detracted from the road to the operation terminal, thereby hindering safe vehicle operation.

According to the fourth technique described above, information is provided according to a verbal question. The question is detected by speech recognition processing. An example of a resulting problem is that a question made during a general conversation is also detected as a question posed to the apparatus and excessive information is provided.

SUMMARY OF THE INVENTION

It is an object of the present invention to at least solve the above problems in the conventional technologies.

An information providing apparatus according to one aspect of the present invention includes a first acquiring unit that acquires scenery image information by capturing images of environs of a mobile body; a second acquiring unit that acquires operator image information by capturing images of an operator operating the mobile body; an extracting unit that, using the scenery image information and recorded map information showing three-dimensionally objects actually present in the environs, extracts map information identical to the scenery image information from the recorded map information; a selecting unit that selects, from the extracted map information, an object corresponding to a position of a point viewed by the operator, using the scenery image information, the operator image information, and the extracted map information; and an output unit that outputs information concerning the selected object.

An information providing method according to another aspect of the present invention includes acquiring scenery image information by capturing images of environs of a mobile body; acquiring operator image information by capturing images of an operator operating the mobile body; extracting, using the scenery image information and recorded map information showing three-dimensionally objects actually present in the environs, map information identical to the scenery image information from the recorded map information; selecting, from the extracted map information, an object corresponding to a position of a point viewed by the operator, using the scenery image information, the operator image information, and the extracted map information; and outputting information concerning the selected object.

A computer readable recording medium, according to still another aspect of the present invention, stores therein an information providing program that causes a computer to execute acquiring scenery image information by capturing images of environs of a mobile body; acquiring operator image information by capturing images of an operator operating the mobile body; extracting, using the scenery image information and recorded map information showing three-dimensionally objects actually present in the environs, map information identical to the scenery image information from the recorded map information; selecting, from the extracted map information, an object corresponding to a position of a point viewed by the operator, using the scenery image information, the operator image information, and the extracted map information; and outputting information concerning the selected object.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a schematic of a display on a display.

DETAILED DESCRIPTION OF THE PREFERRED EMBODIMENTS

Referring to the accompanying drawings, exemplary embodiments according to the present invention are explained in detail below.

An information providing apparatus according to an embodiment of the present invention is portable and can be loaded on a mobile body. A "mobile body" is an object that can be moved by being operated by an operator, such as, for example, a vehicle or a ship. The information providing apparatus is realized by, for example, a portable computer terminal that can be moved with the mobile body. More specifically, the information providing apparatus is realized by, for example, a navigation apparatus, etc., loaded on a vehicle when the mobile body is a vehicle.

Figure 1:
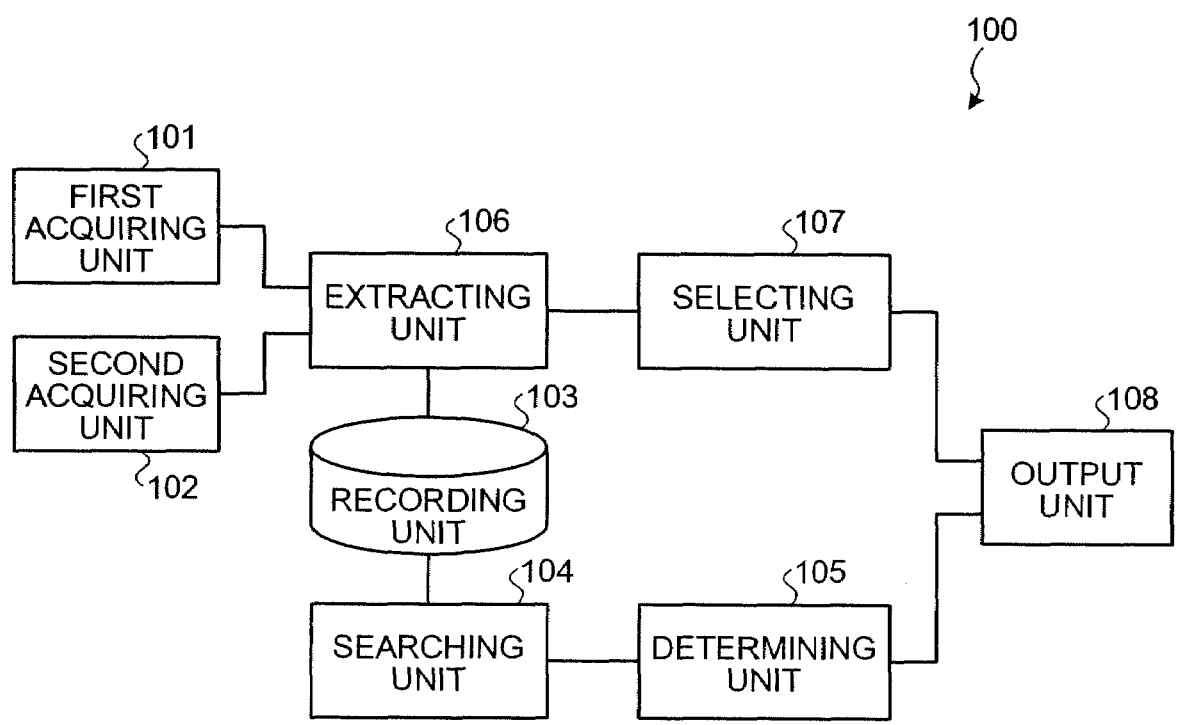
FIG. 1 is a block diagram of an information providing apparatus according to an embodiment of the present invention.

FIG. 1 is a block diagram of the information providing apparatus according to the embodiment of the present invention. As shown in FIG. 1, an information providing apparatus 100 includes a first acquiring unit 101, a second acquiring unit 102, a recording unit 103, a searching unit 104, a determining unit 105, an extracting unit 106, a selecting unit 107, and an output unit 108. Description will be given for the information providing apparatus 100 loaded on a mobile body.

The first acquiring unit 101 acquires scenery image information of the environs of the mobile body operated by an operator. The second acquiring unit 102 acquires operator image information of the operator. The first acquiring unit 101 and the second acquiring unit 102 are each realized by a digital camera, etc.

The recording unit 103 records map information. The map information includes information concerning road networks consisting of nodes and links, and image information depicted using features concerning, for example, facilities, roads, and geographical feature (mountains, rivers, lands). Thereby, objects that actually are present such as facilities, roads, etc. can be represented three-dimensionally. The map information may include text information, information such as names and addresses of facilities, images of roads and facilities, etc. The recording unit 103 may record information that indicates arbitrary locations designated by the operator.

The searching unit 104, using the map information recorded in the recording unit 103 and information indicating multiple arbitrary locations on the map indicated by the map information, searches a route that connects multiple locations to each other. The arbitrary locations are, for example, the current location of the information providing apparatus 100, locations that the operator designates on the map, locations indicated by the information recorded in the recording unit 103, etc.

The determining unit 105 determines a course to an arbitrary location using information concerning the current location of the mobile body and the route from the current location to the arbitrary location. The determining unit 105 determines the course to the arbitrary location from among routes that connect the current location of the mobile body and the arbitrary location using, for example, the route searched by the searching unit 104. The determining unit 105 may determine the course to the arbitrary location using a route designated by the operator in addition to the route searched by the searching unit 104.

The extracting unit 106, from the recorded map information, extracts map information that is identical to the scenery image information using the scenery image information acquired by the first acquiring unit 101 and the above map information. The presence of information identical to the image information of the scenery of the moving body can be judged, for example, by a method described below.

An image of primarily of scenery directly in front of the operator is shot as an image of the scenery around the mobile body. The first acquiring unit 101 acquires scenery image information based on the shot image. Using the acquired scenery image information and the map information, objects included in the scenery image information and objects included in the map information are respectively superimposed on, for example, a display. It is judged whether characteristic points coincide between each corresponding pair of objects. The map information that has a predetermined number of (or more) pieces of characteristic information that are similar to the pieces of characteristic information of an object included in the scenery image information is judged as map information that is identical with the scenery image information.

An "object" is an item that an operator who moves with the mobile body can actually see such as a road, a road sign, a traffic signal, a railroad crossing, a building, a park, or the background. Even for the same mobile body, the angle at which each object is viewed differs depending on the physical constitution of the operator (such as torso length affecting vantage point of the eyes). Therefore, the angle of field of the map information used for judging the presence of identical object information may be adjusted according to the physical constitution of the operator, etc.

In this case, more specifically, for example, an image of the operator is shot and the second acquiring unit 102 acquires image information based on the shot image as operator image information of the operator. The position (the height) of the eyes of the operator is detected using the operator image information of the operator acquired by the second acquiring unit 102, and the presence or absence of identical object information is judged using map information for which the angle of field has been adjusted using the detected position of the eyes as a criterion.

The selecting unit 107, using the scenery image information acquired by the first acquiring unit 101, the operator image information of the operator acquired by the second acquiring unit 102, and the map information extracted by the extracting unit 105, selects an object that corresponds to the position of the point viewed by the operator in the scenery image information from the extracted map information. More specifically, for example, the selecting unit 107 detects the orientation of the face of the operator using the operator image information of the operator shot by the second acquiring unit 102. The selecting unit 107 calculates the angle formed by the detected orientation of the face and the front direction of the operator, and based on the calculated angle, selects, from the map information extracted by the extracting unit 106, the object that corresponds to the position of the point viewed by the operator in the scenery image information.

More specifically, for example, the selecting unit 107 may detect the direction of the line of sight of the operator from the eye shape of the operator and iris position relative to the entire eye using the operator image information acquired by the second acquiring unit 102, calculate the angle formed by the detected direction of the line of sight and the front direction of the operator, and based on the calculated angle, may select, from the map information extracted by the extracting unit 106, the object that corresponds to the position of the point viewed by the operator in the scenery image information. According to this method, only when the face of the operator can be shot, the selecting unit 107 may select the object, in the scenery image information, that corresponds to the position of the point viewed by the operator.

For example, prior to passing though a point where a turn is to be made, an interchange or a junction on a highway, etc., the output unit 108 outputs course information. More specifically, for example, the output unit 108 displays, on a display, visual information indicating a course to an arbitrary location and/or outputs, from a speaker, audio information indicating a course to an arbitrary location.

When the object selected by the selecting unit 107 is a road surface, the output unit 108 outputs information that indicates whether the operator has visually recognized the road surface on the route. When setting to report the course to the arbitrary location by a reporting unit is made, the output unit 108 outputs information that indicating whether the operator has visually recognized the road surface on the route. Even when the object selected by the selecting unit 107 is a road surface, the psychology of an operator such as being anxious about whether the course is correct can be estimated based on the behavior of the operator when the operator looks at the road surface.

Therefore, depending on the behavior of the operator, the information output may vary. For example, when the object selected by the selecting unit 107 is a road surface and the position of a point viewed by the operator corresponding to the object is identified to be the same position for a predetermined number of times consecutively, the output unit 108 outputs information that indicates whether the operator has visually recognized the road surface on the route, or when the object selected by the selecting unit 107 is a road surface and the position of the point viewed by the operator corresponding to the object is identified to be the same position continuously for a predetermined time period, the output unit 108 outputs information that indicates whether the operator has visually recognized the road surface on the route.

When the object selected by the selecting unit 107 is a road surface and the position of the point viewed by the operator corresponding to the object is identified to be the same position for a predetermined number of times consecutively and, thereafter, is identified to be the same position for a predetermined time period continuously, the output unit 108 outputs information that indicates whether the operator has visually recognized the road surface on the route. The output information in all three exemplified cases may vary, thereby the output unit 108 may output different information depending on the behavior of the operator.

When the object selected by the selecting unit 107 is a sightseeing asset or is an amusement facility, the output unit 108 may output relevant descriptive information. In this case, a sightseeing asset is a historical, cultural, or natural scenic attraction, i.e., places or objects of popular interest, and an amusement facility is, for example, a theme park or an amusement park. More specifically, for example, when the operator gazes at a lake on one side of the road, the output unit 108 outputs, "The lake you see on the right is Lake Kawaguchi. The depth of Lake Kawaguchi is XX meters. Tourists visit the lake throughout the year. You can enjoy rowing boats and bass fishing . . . " and displays photographs of Lake Kawaguchi on the display.

Figure 2:
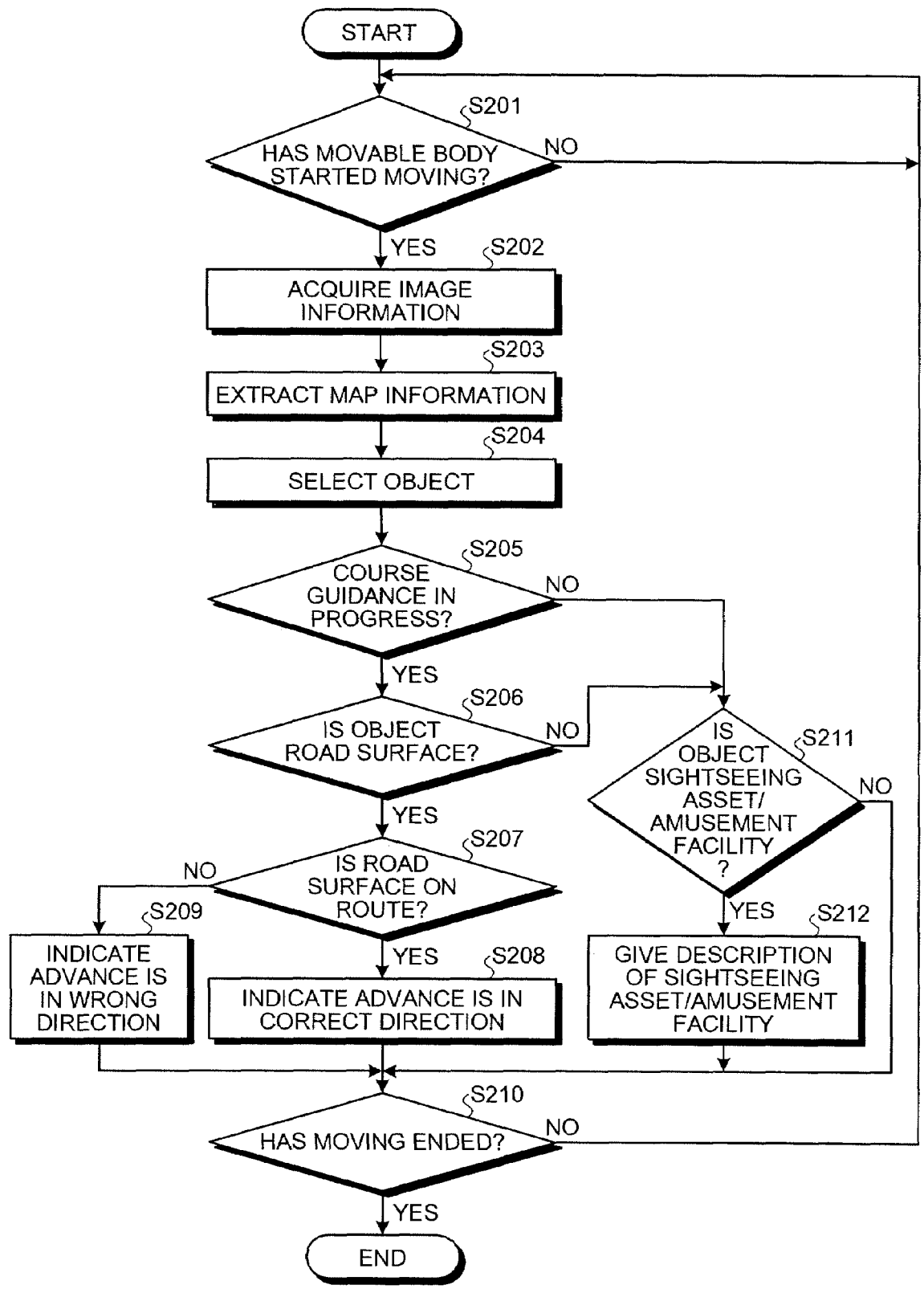
FIG. 2 is a flowchart of an information providing process of the information providing apparatus.

FIG. 2 is a flowchart of a process performed by the information providing apparatus. As shown in the flowchart, it is determined whether the mobile body has started to move (step S201). At step S201, whether a mobile body has started to move is determined by, for example, determining whether the engine of the mobile vehicle has commenced operation.

At step S201, to determine whether a mobile body has started to move may be determined by whether the gear of the mobile body in "drive" (when the vehicle is an automatic transmission car). Step S201 involves waiting for the mobile body to start moving (step S201: NO) and when the mobile body starts moving (step S201: YES), the first acquiring unit 101 and the second acquiring unit 102 respectively acquire scenery image information and operator image information (step S202).

The extracting unit 106, from recorded map information and using the image information acquired at step S202, extracts map information identical to the scenery image information (step S203). The selecting unit 107 selects, from the extracted map information, an object that corresponds to the position of the point viewed by the operator, in the scenery image information (step S204) and it is determined whether course guidance is being given at the time when the object is selected (step S205).

At step S205, when course guidance is being given (step S205: YES), it is determined whether the object selected at step S204 is a road surface (step S206). When the object is not the road surface (step S206: NO), the procedure advances to step S211. On the other hand, when the object selected at step S204 is the road surface (step S206: YES), it is determined whether the road surface is the road surface on a route from the current location to the arbitrary location (step S207).

At step S207, when the object selected at step S204 is the road surface on the route from the current location to the arbitrary location (step S207: YES), the output unit 108 outputs an image and sound indicating a message such as, for example, "Please take this road" and, thereby, the output unit 108 indicates that the direction of advancement in the line of sight of operator is correct (step S208) and the procedure advances to step S210.

On the other hand, at step S207, when the object selected at step S204 is not the road surface on the route from the current location to the arbitrary location (step S207: NO), the output unit 108 outputs an image and sound indicating a message such as, for example, "Please take the road next to this one" and, thereby, the output unit 108 indicates that the direction of advancement in the line of sight of operator is incorrect (step S209) and the procedure advances to step S210.

At step S210, it is determined whether the mobile body has stopped moving and, when the mobile body has not stopped moving (step S210: NO), the procedure returns to step S210. When the mobile body has stopped moving (step S210: YES), the series of process steps end. When course guidance is not being given at step S205 (step S205: NO), it is determined whether or not the object selected at step S204 is a sightseeing asset or an amusement facility (step S211).

When the object is a sightseeing asset or an amusement facility at step S211 (step S211: YES), the output unit 108 outputs an image and sound describing the sightseeing asset or the amusement facility and, thereby, the output unit 108 provides explanation of the sightseeing asset or the amusement facility (step S212). When the object is not a sightseeing asset or an amusement facility (step S211: NO), the procedure moves to step S210.

As described above, according to the information providing apparatus 100 of the embodiment, information that the operator needs can be safely and easily provided by providing, to the operator, information corresponding to the point at which the operator is actually looking, thereby, enabling the operator to safely and easily obtain required information.

According to the information providing apparatus 100 of the embodiment, the information required by the moving operator can be safely and easily provided by providing the operator with information that indicates whether the operator is actually able to follow the route by sight. Thereby, the operator can safely and smoothly move along the determined route.

According to the information providing apparatus 100 of the embodiment, the information required by the operator who is in motion can be safely and easily provided by providing the operator with information that indicates whether the operator is actually able to follow the route by sight only when the operator exhibits behavior from which it is estimated that the operator actually has anxiety about whether the route is being correctly followed, behavior such as the operator repeatedly looking at a specific point while the operator looks here and there on the road surface, the operator gazing at a specific point, or the operator repeatedly looking at and later gazing at a specific point. By providing the information only when the operator is estimated to have anxiety, the operator can safely and smoothly move along the determined route without feeling bombarded with information.

According to the information providing apparatus 100 of the embodiment, information concerning sightseeing assets and amusement facilities, in which the operator estimated to have interest, can be easily provided to the operator by providing information concerning the sightseeing asset or amusement facility at which the operator is actually looking. Thereby, the operator can safely obtain required information without feeling being bombarded with excessive information.

According to the information providing apparatus 100 of the embodiment, the point at which the operator is actually looking can be continuously or consecutively identified by causing the first acquiring unit 101 to shoot the images of the scenery around the mobile body and the second acquiring unit 102 to shoot the images of the operator. Thereby, the information that the operator needs can be surely provided at a time when the operator needs the information.

Figure 3:
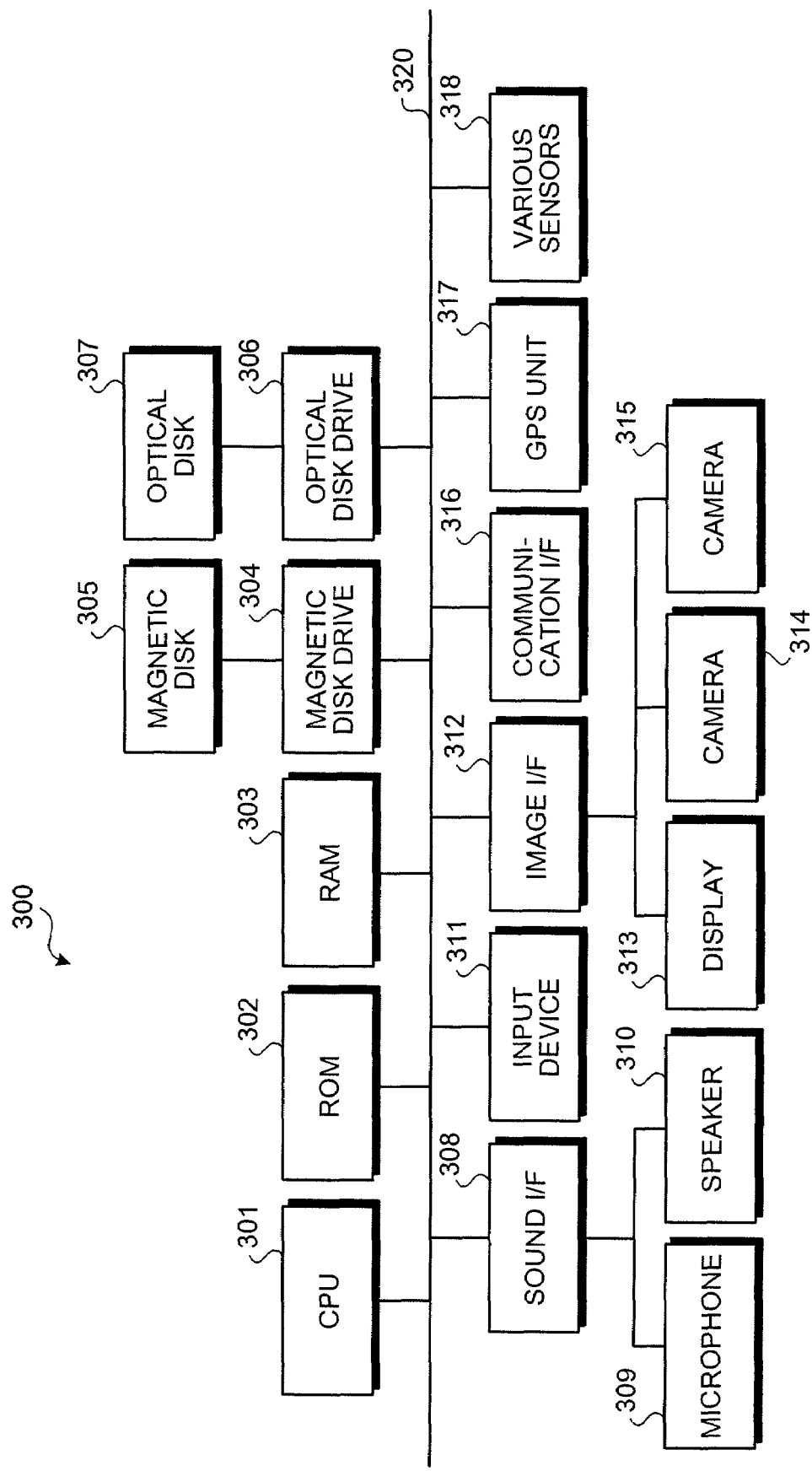
FIG. 3 is a block diagram of a navigation apparatus of an application example.

FIG. 3 is a block diagram of a navigation apparatus according to the embodiment as applied, in an example, loaded on a vehicle. A shown in FIG. 3, the navigating apparatus 300 includes a central processing unit (CPU) 301, a read-only memory (ROM) 302, a random access memory (RAM) 303, a magnetic disk drive 304, a magnetic disk 305, an optical disk drive 306, an optical disk 307, a sound interface (I/F) 308, a microphone 309, a speaker 310, an input device 311, a video I/F 312, a display 313, cameras 314 and 315, a communication I/F 316, a global positioning system (GPS) unit 317, and various sensors 318. The components 301 to 318 are respectively connected by a bus 320.

The CPU 301 controls the entire navigating apparatus 300. The ROM 302 records programs such as a boot program, a route searching program, a route guiding program, and an information providing program. The RAM 303 is used as a work area for the CPU 301. The route searching program is, for example, a program that searches a route passing through a first and a second location designated by an operator of the navigating apparatus 300. The first and the second locations are, for example, a starting point and a destination.

The route guiding program is a program that, by being executed by the CPU 301, guides a user by outputting, with a predetermined timing, guide information such as sound and images that indicate the course to an arbitrary location such that the user moves along a predetermined route. The predetermined route is an arbitrary route set by the user such as a route searched by executing a route searching program.

The information providing program is a program that, by being executed by the CPU 301, causes the apparatus to acquire scenery image information concerning the scenery around a vehicle driven by a driver and driver image information concerning the driver, to extract map information identical to the scenery image information from map information using the acquired image information and the recorded map information that shows three-dimensionally objects actually present, to select, from the extracted map information, an object corresponding to the position of the point viewed by the driver in the scenery image information, and to output information concerning the selected object.

The information providing program is a program that, by being executed by the CPU 301, causes the apparatus to determine a course to an arbitrary location using information concerning the current location of the vehicle and a route from the current location to the arbitrary location, to output information concerning the determined course, and, when the selected object is a road surface, to output information that indicates whether the operator visually recognizes the road surface on the route.

The information providing program may, by being executed by the CPU 301, output the information that indicates whether the operator visually recognizes the road surface on the route when the selected object is the road surface and the position of the point viewed by the operator corresponding to the object is identified to be the same position consecutively for a predetermined number of times.

The information providing program may, by being executed by the CPU 301, output the information that indicates whether the operator visually recognizes the road surface on the route when the selected object is the road surface and the position of the point viewed by the operator corresponding to the object is identified to be the same position continuously for a predetermined time period.

The information providing program may, by being executed by the CPU 301, output the information that indicates whether the operator visually recognizes the road surface on the route when the selected object is the road surface and the position of the point viewed by the operator corresponding to the object is identified to be the same position consecutively for the predetermined number of times and, thereafter, continuously for the predetermined time period.

The information providing program is a program that, by being executed by the CPU 301, causes the apparatus to output information that describes an object or place of popular interest or an amusement facility when the selected object is the object or place of popular interest or the amusement facility.

The magnetic disk drive 304 controls the reading and writing of information to and from the magnetic disk 305 according to the control of the CPU 301. The magnetic disk 305 records information written under the control of the magnetic disk drive 304. More specifically, the magnetic disk drive 304 records, for example, the above map information into the magnetic disk 305. A hard disk (HD) or a flexible disk (FD), for example, may be used as the magnetic disk 305.

The optical disk drive 306 controls the reading and writing of information to and from the optical disk 307 according to the control of the CPU 301. The optical disk 307 is a recording medium from which information is read under the control of the optical disk drive 306. The optical disk 307 may be writable or may be removable from the optical disk drive 306. More specifically, a magneto optical disk (MO) or a memory card, for example, can be used as the optical disk 307.

The sound I/F 308 is connected to the microphone 309 for inputting sound and the speaker 310 for outputting sound. Sound received by the microphone 309 is converted from analog to digital in the sound I/F 308. Sound is output from the speaker 310. A remote controller, a keyboard, a mouse, a touch panel, etc., that each include a plurality of keys for inputting characters, digits, various instructions, etc., can be used as the input device 311.

The camera 314 is installed, for example, on the back (on the wind shield side) of a rear-view mirror (see a reference numeral "710" in FIG. 7) and shoots images of the scenery around the vehicle. The camera 315 is installed, for example, in the vicinity of a sun visor (see a reference numeral "712" in FIG. 7) and shoots images of the driver of the vehicle. The above magnetic disk drive 304 may record image information shot by the cameras 314 and 315 in the magnetic disk 305.

The video I/F 312 is connected to the display 313. More specifically, the video I/F 312 consists of, a graphic controller that controls the entire display 313, a buffer memory such as a video RAM (VRAM) that records temporarily image information that can immediately be displayed, a controlling integrated circuit (IC) that display-controls the display 313 based on the image information output from the graphic controller, etc.

In addition to the map information, the display 313 can display, being superimposed, information concerning traffic congestion, a guide route, etc. The display 313 may display an icon, a cursor, a menu, etc. For example, a cathode ray tube (CRT), a thin-film-transistor (TFT) liquid crystal display, a plasma display, etc., may be employed as the display 313.

The communication I/F 316 is connected to a network wirelessly and functions as an interface between the network and the CPU 301. The network may be a local area network (LAN), a wide area network (WAN), a public telephone network, a mobile telephone network, etc. The communication I/F 316 consists of, for example, an frequency modulation (FM) tuner, a Vehicle Information and Communication System (VICS) (a registered trademark), e.g., beacon receiver, a radio communication apparatus, or another communication apparatus and acquires road traffic information such as traffic congestion and traffic regulations distributed from a VICS center.

The GPS unit 317 acquires information indicating the current location of the vehicle (the current location of the navigating apparatus 300) using output values from the GPS and various sensors. Though omitted in the drawings, the navigating apparatus 300 includes a gyro sensor, and an input I/F into which output values from the gyro sensor, vehicle velocity pulses from the vehicle, etc., are input. The CPU 301 judges the direction in which the vehicle is moving (when the vehicle is stopped, the front orientation thereof) from the output values from the gyro sensor.

The first acquiring unit 101, the second acquiring unit 102, the determining unit 105, the extracting unit 106, the selecting unit 107, and the output unit 108 in the information providing apparatus 100 shown in FIG. 1 realize respective functions thereof by executing of the CPU 301 a predetermined program and controlling of the CPU 301 the components in the navigating apparatus 300, using the programs and the pieces of information recorded in the ROM 302, the RAM 303, the magnetic disk 305, the optical disk 307, etc., in the navigating apparatus 300 shown in FIG. 3.

That is, the navigating apparatus 300 of the example can execute the functions that the information providing apparatus 100 shown in FIG. 1 has, according to the information providing process procedure shown in FIG. 2, using the information providing program recorded in the recording medium in the navigating apparatus 300.

Figure 4:
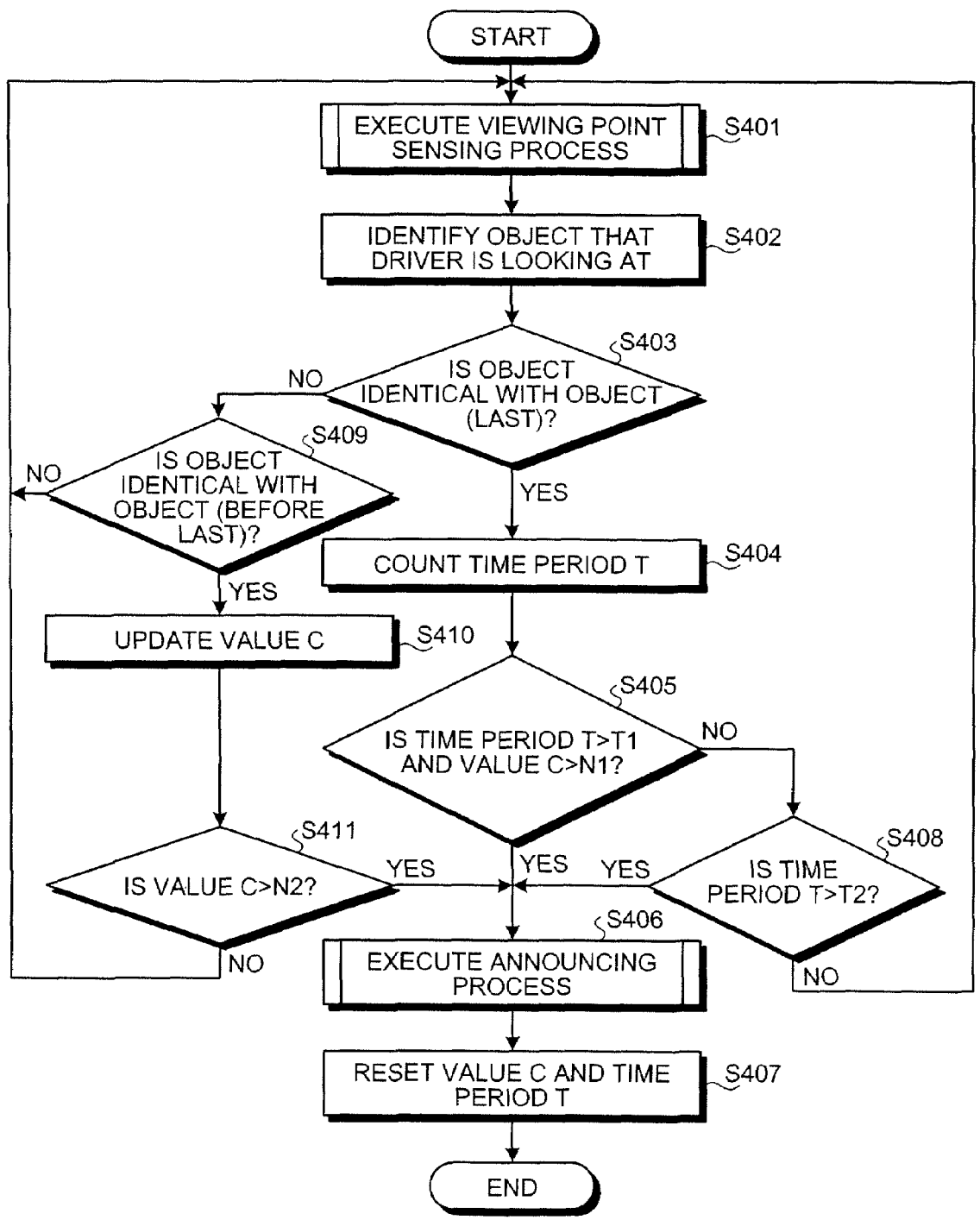
FIG. 4 is a flowchart of an information providing process of the navigation apparatus.

FIG. 4 is a flowchart for the navigating apparatus 300 of the example. As shown in the flowchart of FIG. 4, a viewing point sensing process for a driver is executed (step S401) and an object that the driver is looking at is identified (step S402).

It is determined whether the object identified at step S402 (hereinafter, "object (current)") and an object that the driver looked at last (hereinafter, "object (last)") are identical (step S403). When the object (current) is identical to the object (last) (step S403: YES), a time period T from the time when the driver starts looking at the object (current) to the time when the driver looks at another object next is timed (step S404).

It is determined whether the time period T is longer than a predetermined time period T1, and it is determined whether a value C is larger than a predetermined number of times N1 (step S405). The predetermined time period T1 is information recorded in the magnetic disk 305, etc., and is a threshold value used to judge the length of the time period T.

The value C is information recorded in the RAM 303, etc., and, as to an object that the driver looked at the time before last (hereinafter, "object (before last)"), represents the number of times for which the driver has repeatedly looked at the object (before last). The predetermined number of times is information recorded in the magnetic disk 305, etc., and is a threshold value used to judge the degree of the value C (hereinafter, "the number of times C").

When the time period T is longer than the predetermined time period T1 and the number of times C is larger than the predetermined number of times N1 at step 405 (step S405: YES), an announcing process is executed (step S406) and the number of times C and the time period T are reset (step S407) and the series of process steps end.

When, at least, the time period T is equal to or shorter than the predetermined time period T1 or the number of times C is equal to or smaller than the predetermined number of times N1 at step 405 (step S405: NO), it is determined whether the time period T is longer than a predetermined time period T2 (step S408). The predetermined time period T2 is information recorded in the magnetic disk 305, etc., and is a threshold value that is also used to judge the degree of the time period T and is different from the predetermined time period T1. When the time period T is longer than the predetermined time period T2 (step S408: YES), the procedure moves to step S406 and, when the time period T is equal to or shorter than the predetermined time period T2 (step S408: NO), the procedure returns to step S401.

When the object (current) is not identical to the object (last) at step S403 (step S403: NO), it is determined whether the object (current) is identical to the object (before last) (step S409). When the object (current) is not identical to the object (before last) (step S409: NO), the procedure returns to step S401.

When the object (current) is identical to the object (before last) at step S409 (step S409: YES), the number of times C is updated by adding one to the number of times C (step S410) and it is judged whether the number of times C is larger than a predetermined number of times N2 (step S411). The predetermined number of times N2 is information recorded in the magnetic disk 305, etc., and is a threshold value that is used to judge the degree of the number of times C and different from the above predetermined number of times N1.

When the number of times C is larger than the predetermined number of times N2 at step S411 (step S411: YES), the procedure moves to step S406 and, when the number of times C is equal to or smaller than the predetermined number of times N2 (step S411: NO), the procedure returns to step S401.

Figure 5:
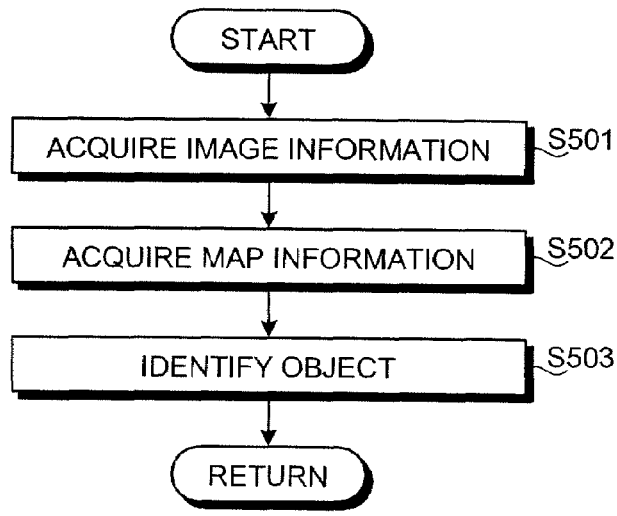
FIG. 5 is a flowchart of a viewing point sensing process procedure.

FIG. 5 is a flowchart of a viewing point sensing process procedure. The process procedure shown in FIG. 5 is executed at the above step S401 of FIG. 4. As shown in the flowchart of FIG. 5, the image information of the scenery around the vehicle shot by the camera 314 and the image information of the driver shot by the camera 315 are acquired (step S501) and the map information recorded in the magnetic disk 305 is acquired (step S502).

An object that the driver is looking at is identified using the image information acquired at step S501 and the map information acquired at step S502 (step S503) and, after ending the series of process steps, the process steps from step S501 are repeated. When the CPU 301 has acquired the identification result identified at step S503, the CPU 301 executes the process step of step S402 in the above information providing process.

Although the viewing point sensing process is executed using the map information recorded in the magnetic disk 305 in the example, the process is not limited to this method. For example, the viewing point sensing process may be execute using map information acquired from an apparatus present outside the navigating apparatus 300 (hereinafter, "external apparatus") by communicating with the external apparatus using the communication I/F 316.

Figure 6:
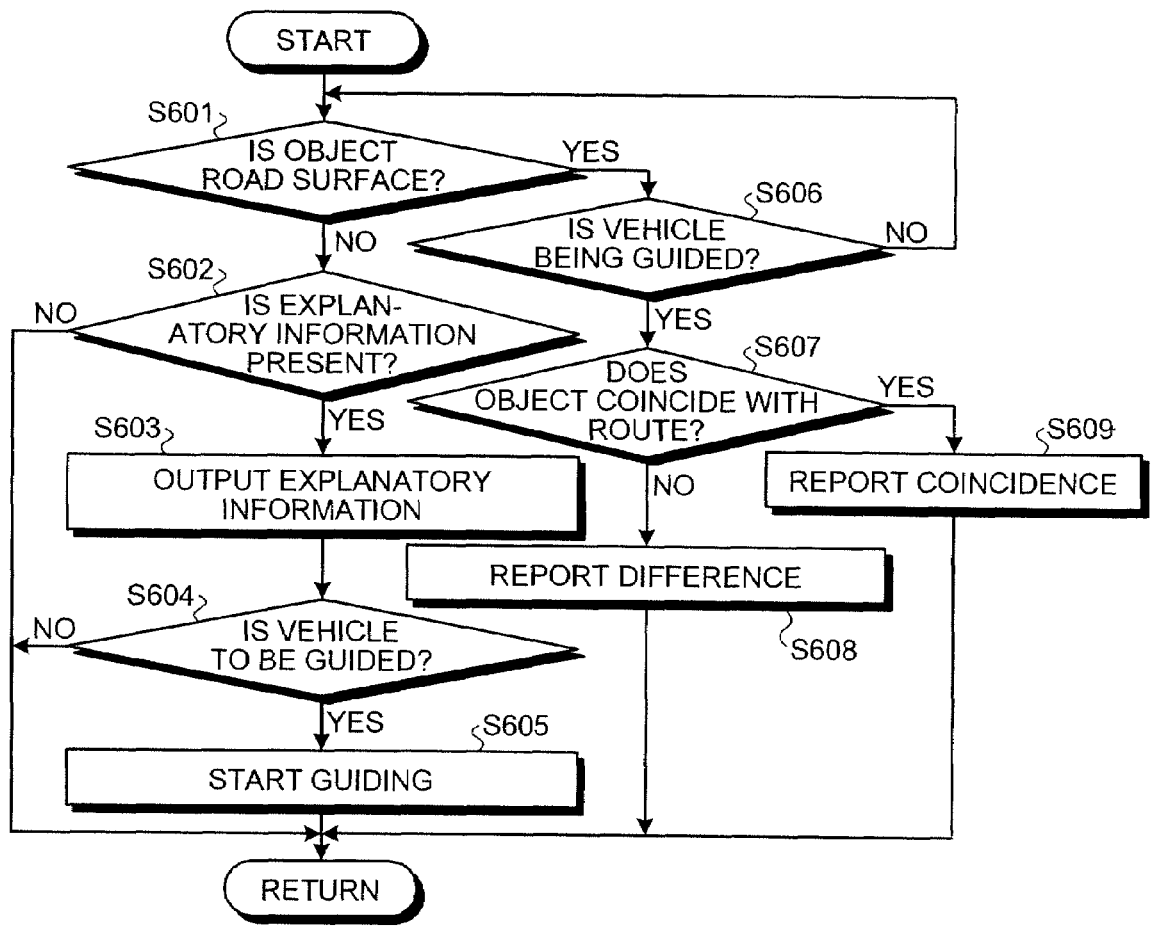
FIG. 6 is a flowchart of an announcing process procedure.

FIG. 6 is a flowchart of an announcing process procedure. The process procedure shown in FIG. 6 is executed at the above step S406 shown in FIG. 4. A shown in the flowchart of FIG. 6, it is determined whether the object (current) identified at step S402 in the information providing process is a road surface (step S601).

When the object (current) is not a road surface at step S601 (step S601: NO), it is determined whether descriptive information describing the object (current) is present in the descriptive information recorded in the optical disk 307 (step S602). The descriptive information is information that describes, for example, the features, points to see, costs necessary to visit (admission and observation fee), the origin (in the case of a scenic spot, the time when the spot was formed and, in the case of a building, the time when the building was built, etc.) of the object (current), etc.

When no descriptive information is present at step S602 (step S602: NO), the series of process steps end. When the descriptive information is present (step S602: YES), the corresponding descriptive information is output (step S603) and it is determined whether the vehicle is to be guided to the object (current) (step S604).

At step S604, for example, the speaker 310 outputs an inquiry that asks whether the driver desires to move to the object (current) that the driver is looking at, such as "Do you want to go there?", and the display 313 displays operational keys respectively representing the presence and absence of the driver intention to move to the object (current) such as "I want to go." or "I don't want to go.", and it is determined which of the keys displayed on the display 313 has been selected. Thereby, it is judged whether the vehicle is to be guided to the object (current).

When it is judged that the vehicle is to be guided to the object (current) at step S604 (step S604: YES), guiding of the vehicle to the object (current) is started (step S605) and the series of process steps end. At step S605, the guiding program is started up and location information indicating the object (current) is output to the guiding program. Thereafter, due to the guiding program being executed, guiding of the vehicle from the current location to the location representing the object (current) is executed. When it is judged that the vehicle is not to be guided to the object (current) (step S604: NO), the series of process steps end and, thereafter, the process steps from step S601 are repeated.

On the other hand, when the object (current) is a road surface at step S601 (step S601: YES), it is judged whether the vehicle is being guided (step S606). When the vehicle is not being guided (step S606: NO), the procedure returns to step S601. When the vehicle is being guided (step S606: YES), it is judged whether the location of the object (current) coincides with the route on which the vehicle is being guided (step S607).

When the location of the object (current) does not coincide with the route on which the vehicle is being guided at step S607 (step S607: NO), the difference between the location of the object (current) and the route on which the vehicle is being guided is indicated (step S608). At step S608, the speaker 310 outputs a message such as, for example, "That is the wrong road." or "Take the road on the left of that road."

On the other hand, when the location of the object (current) coincides with the route on which the vehicle is being guided at step S607 (step S607: YES), indication is given that the road surface that the driver is looking at and the road surface on the route on which the vehicle is being guided coincide (step S609) and the series of process steps end. Thereafter, the process steps from step S601 are repeated. At step S609, the speaker 310 outputs a message such as, for example, "That is the location." or "Take this road."

Figure 7:
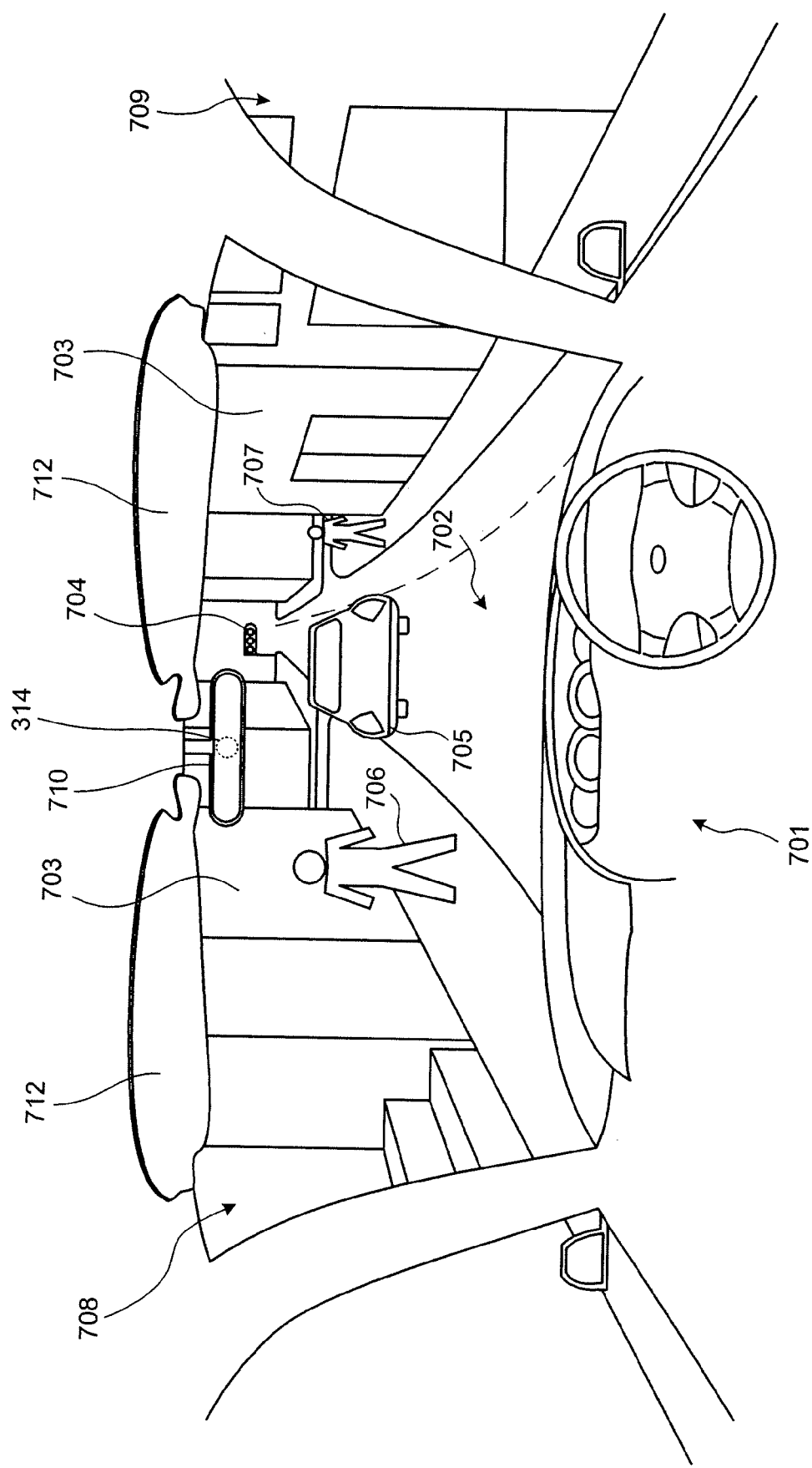
FIG. 7 is a schematic of the field of vision of the driver.

Description will be given for the functions of the navigating apparatus 300 of the example with reference to FIGS. 7 and 8. FIG. 7 is a schematic of the field of vision of the driver. FIG. 8 is a schematic of a display on the display 313. As shown in FIG. 7, a driver sitting on the driver seat of a vehicle 701 can see through a wind shield 708 or a side window 709 of the vehicle 701 the scenery around the vehicle 701 such as, for example, a road (road surface) 702, buildings 703 on the roadside, a traffic signal 704, another vehicle 705, pedestrians 706 and 707. A reference numeral "710" in FIG. 7 denotes a rear-view mirror. The camera 314 is installed, for example, on the back side (the wind shield side) of the room mirror 710 (see a dotted circle in FIG. 7). A reference numeral "712" denotes a sun visor.

As shown in FIG. 8, the display 313 displays three-dimensional image information that reproduces the field of vision of the driver. The display 313 three-dimensionally displays the objects (such as the road (road surface) 702, the buildings 703 on the roadside, and the traffic signal 704), excluding the objects of which the presence is uncertain such as the other vehicle 705 and the pedestrians 706 and 707, among the various objects that fall within the field of vision of the driver. A reference numeral "801" denotes the road (road surface) 702. A reference numeral "802" (802a to 802d) denotes the buildings 703 on the roadside. A reference numeral "803" denotes the traffic signal 704. When the vehicle is being guided, the display 313 displays an arrow 804 that indicates the traveling position of the vehicle 701.

For example, as the arrow 804 indicates, it is assumed that the guiding is executed according to a route that passes through a narrow alley between a building denoted by a reference numeral 802a and a building denoted by a reference numeral 802b. As shown in FIG. 7, it is assumed that the narrow alley between the building denoted by a reference numeral 802a and the building denoted by a reference numeral 802b is difficult to see within the actual field of vision of the driver because the pedestrian 707 is present and, in this situation, indication "Make a right turn at the next intersection." is output and, thereafter, the driver views the intersection with a traffic signal.

In this case, the navigating apparatus 300 that has executed the above processes of FIGS. 4 to 6 causes the speaker 310 to output indications "That is not the road. Make a right turn onto the road immediately before it." and causes the display 313 to display a three-dimensional image having an arrow 804 therein shown in FIG. 8. Thereby, the driver can travel into the narrow alley between the building denoted by the reference numeral 802a and the building denoted by the reference numeral 802b by checking the display on the display 313.

Therefore, even when the road is difficult to find or when it is not clear to the driver which road to take, the driver can be urged to re-check the direction in which to advance when the driver has incorrectly perceived the road to take.

As described above, according to the navigating apparatus 300 of the example, information corresponding to the actual location of the starting location of the driver can be provided to the driver. Thereby, the navigating apparatus 300 can safely and easily provide information that the driver needs. Hence, the driver can safely and easily obtain necessary information.

According to the navigating apparatus 300 of the example, whether the driver actually captures visually the route on which the vehicle is being guided can be reported to the driver. Thereby, the navigating apparatus can safely and easily provide the necessary information during driving. Hence, the driver can safely and smoothly move along an optimal route.

According to the navigating apparatus 300 of the example, the announcing process is executed only when the operator exhibits behavior from which it is presumed that the operator is interested in a specific object, such as that the operator repeatedly looks at the specific object, the operator gazes at the specific object, or the operator repeatedly looks at and later gazes at the specific object. Thereby, the navigating apparatus 300 can easily and properly provide information that the driver needs. Hence, the driver can safely and easily obtain necessary information without feeling bombarded with information.

For example, in the case where the specific object is a road surface, the navigating apparatus 300 can easily and properly provide the information indicating that the direction to advance in is correct or wrong by providing information that indicates whether the road surface that the driver is looking at coincides with the route on which the vehicle is being guided only when it is estimated that the driver is at a loss as to the direction to advance in. Thereby, the driver can safely and easily obtain necessary information and can safely and smoothly move along the route without feeling bombarded with information.

For example, when the specific object is an object other than a road surface such as an object or place of popular interest or an amusement facility, the navigating apparatus 300 can easily provide relevant information in which it is estimated that the driver is interested. Therefore, the operator can safely and easily obtain necessary information without feeling that bombarded with excessive information.

According to the navigating apparatus 300 of the example, positions of the points actually viewed by the driver can be continuously and consecutively identified by shooting an image of the scenery around the vehicle and an image of the driver respectively using the two cameras 314 and 315. Therefore, information that the driver needs can be surely provided at a time in which the driver needs the information.

As described above, according to the information providing apparatus, and method and computer product thereof according to the embodiment, information that the operator needs can safely and easily be provided. Hence, the operator can safely and easily obtain necessary information.

The information providing method described in the embodiment can be realized by executing a program prepared in advance on a computer such as a personal computer or a work station. The program is recorded on a computer-readable recording medium such as a hard disk, a flexible disk, a compact disk read only memory (CD-ROM), an MO, or a digital versatile disk (DVD) and is executed by being read from the recording medium by the computer. The program may a transmission medium distributable through a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2006-214552 filed in Japan on Aug. 7, 2006.

What is claimed is:

1. An information providing apparatus comprising:
a first acquiring unit that acquires scenery image information by capturing images of environs of a mobile body;
a second acquiring unit that acquires operator image information by capturing images of an operator operating the mobile body;
an extracting unit that, using the scenery image information and recorded map information showing three-dimensionally objects actually present in the environs, extracts map information identical to the scenery image information from the recorded map information;
a selecting unit that selects, from the extracted map information, an object corresponding to a position of a point viewed by the operator, using the scenery image information, the operator image information, and the extracted map information;
a determining unit that determines a course to an arbitrary location using information concerning a current location of the mobile body and information concerning a route from the current location to the arbitrary location; and
an output unit that outputs information concerning the selected object, outputs information concerning the determined course, and when the selected object is a road surface and the road surface belongs to the route, further outputs information that indicates whether a direction of a line of sight of the operator matches a correct route.

2. The information providing apparatus according to claim 1, wherein
when the selected object is the road surface and the position of the point viewed by the operator that corresponds to the object is identified to be a same position a given number of times consecutively, the output unit outputs information that indicates whether the direction of the line of sight of the operator matches the correct route.

3. The information providing apparatus according to claim 1, wherein
when the selected object is the road surface and the position of the point viewed by the operator that corresponds to the object is identified to be a same position for a given period of time consecutively, the output unit outputs information that indicates whether the direction of the line of sight of the operator matches the correct route.

4. The information providing apparatus according to claim 1, wherein
when the selected object is the road surface and the position of the point viewed by the operator corresponding to the object is identified to be a same position for a predetermined number of times consecutively and, thereafter, is identified to be a same position for a predetermined time period continuously, the output unit outputs information that indicates whether the direction of the line of sight of the operator matches the correct route.

5. The information providing apparatus according to claim 1, wherein
when the selected object is any one of a sightseeing asset and an amusement facility, the output unit outputs information that describes the selected object.

6. An information providing method comprising:
acquiring scenery image information by capturing images of environs of a mobile body;
acquiring operator image information by capturing images of an operator operating the mobile body;
extracting, using the scenery image information and recorded map information showing three-dimensionally objects actually present in the environs, map information identical to the scenery image information from the recorded map information;
selecting, from the extracted map information, an object corresponding to a position of a point viewed by the operator, using the scenery image information, the operator image information, and the extracted map information;
determining a course to an arbitrary location using information concerning a current location of the mobile body and information concerning a route from the current location to the arbitrary location; and
outputting information concerning the selected object, outputting information concerning the determined course, and when the selected object is a road surface and the road surface belongs to the route, further outputting information that indicates whether a direction of a line of sight of the operator matches a correct route.

7. The information providing method according to claim 6, further comprising:
outputting information that indicates whether the direction of the line of sight of the operator matches the correct route when the selected object is the road surface and the position of the point viewed by the operator that corresponds to the object is identified to be a same position a given number of times consecutively.

8. The information providing method according to claim 6 further comprising:
outputting information that indicates whether the direction of the line of sight of the operator matches the correct route when the selected object is the road surface and the position of the point viewed by the operator that corresponds to the object is identified to be a same position for a given period of time consecutively.

9. The information providing method according to claim 6, further comprising:
outputting information that indicates whether the direction of the line of sight of the operator matches the correct route when the selected object is the road surface and the position of the point viewed by the operator corresponding to the object is identified to be a same position for a predetermined number of times consecutively and, thereafter, is identified to be the same position for a predetermined time period continuously.

10. The information providing method according to claim 6, further comprising:
outputting information that describes a sightseeing asset or an amusement facility when the selected object is the sightseeing asset or the amusement facility.

11. A non-transitory computer readable recording medium that stores therein an information providing program that causes a computer to execute:
acquiring scenery image information by capturing images of environs of a mobile body;
acquiring operator image information by capturing images of an operator operating the mobile body;
extracting, using the scenery image information and recorded map information showing three-dimensionally objects actually present in the environs, map information identical to the scenery image information from the recorded map information;
selecting, from the extracted map information, an object corresponding to a position of a point viewed by the operator, using the scenery image information, the operator image information, and the extracted map information;
determining a course to an arbitrary location using information concerning a current location of the mobile body and information concerning a route from the current location to the arbitrary location; and
outputting information concerning the selected object, outputting information concerning the determined course, and when the selected object is a road surface and the road surface belongs to the route, further outputting information that indicates whether a direction of a line of sight of the operator matches a correct route.

12. The non-transitory computer readable recording medium according to claim 11, storing therein an information providing program that further causes a computer to execute:
outputting information that indicates whether the direction of the line of sight of the operator matches the correct route when the selected object is the road surface and the position of the point viewed by the operator that corresponds to the object is identified to be a same position a given number of times consecutively.

13. The non-transitory computer readable recording medium according to claim 11, storing therein an information providing program that further causes a computer to execute:

outputting information that indicates whether the direction of the line of sight of the operator matches the correct route when the selected object is the road surface and the position of the point viewed by the operator that corresponds to the object is identified to be a same position for a given period of time consecutively.

14. The non-transitory computer readable recording medium according to claim 11, storing therein an information providing program that further causes a computer to execute:

outputting information that indicates whether the direction of the line of sight of the operator matches the correct route when the selected object is the road surface and the position of the point viewed by the operator corresponding to the object is identified to be a same position for a predetermined number of times consecutively and, thereafter, is identified to be the same position for a predetermined time period continuously.

15. The non-transitory computer readable recording medium according to claim 11, storing therein an information providing program that further causes a computer to execute:

outputting information that describes a sightseeing asset or an amusement facility when the selected object is the sightseeing asset or the amusement facility.

* * * * *